Sept. 13, 1966 M. I. SANDERSON 3,272,159
FARM IMPLEMENT FOR SEEDING

Filed Feb. 19, 1965 4 Sheets-Sheet 1

INVENTOR.
Martin I. Sanderson
BY
Attorneys

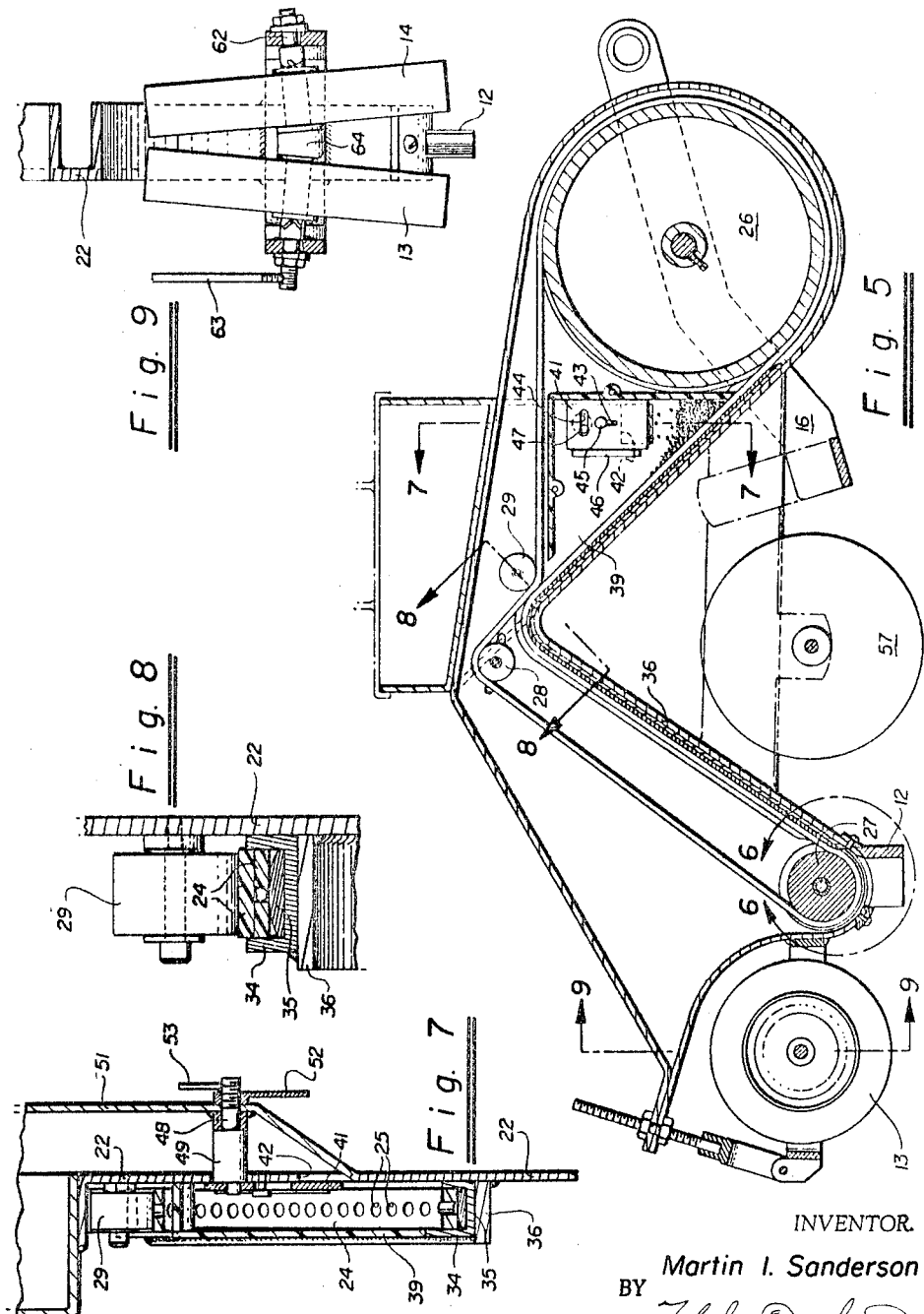

Sept. 13, 1966 M. I. SANDERSON 3,272,159
FARM IMPLEMENT FOR SEEDING
Filed Feb. 19, 1965 4 Sheets-Sheet 4
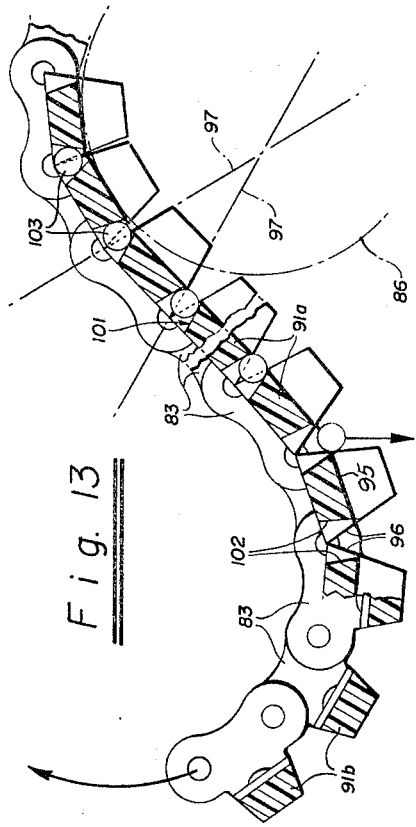
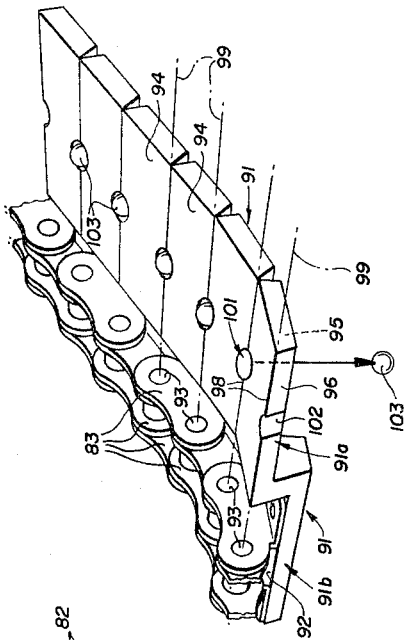
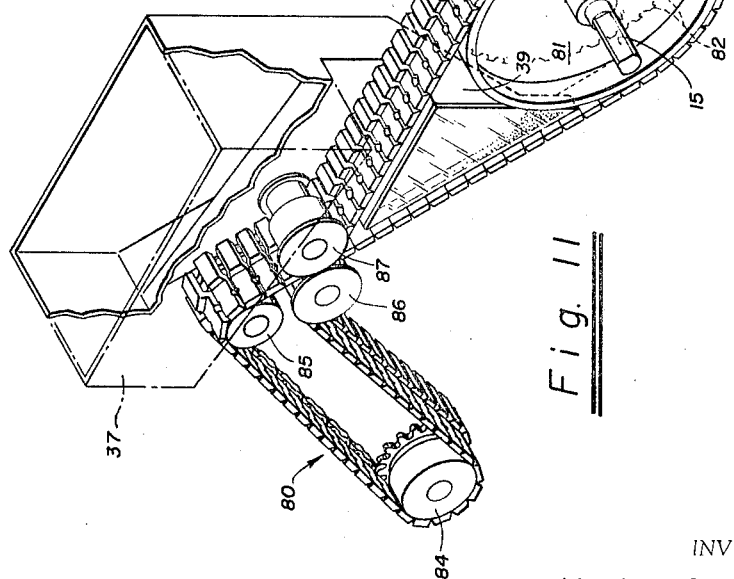
INVENTOR.
Martin I. Sanderson
BY
Attorneys 3,272,159
FARM IMPLEMENT FOR SEEDING
Martin I. Sanderson, 132 Grove St., Salinas, Calif.
Filed Feb. 19, 1965, Ser. No. 433,970
16 Claims. (Cl. 111—71)

This invention is a continuation-in-part of the invention of my prior application Serial No. 333,341, filed Dec. 26, 1963, now abandoned, and relates to farm implements, particularly farm implements for planting seeds at individual, spaced positions in a field-row.

When planting seeds in a field-row, where certain crops are involved, for example cabbages, it is not unusual to find occasional undesired extra seeds being planted at the individual plant positions. Accordingly, when the extra seed develops into a plant, it produces what is referred to as a "double" which must be eliminated in many instances by hand labor.

The opposite condition to the planting of a "double" is known as a "skip" and can occur for various reasons. Where seeds are carried in pocket openings or holes in a cyclic moving carrier such as a belt, the seed pocket opening can become packed with fractured seeds or other seed "dust" whereby the seed pocket opening is effectively eliminated from the cyclic seed carrier. Thus during each revolution of the seed carrier movement there will be developed a "skip" corresponding to the obstructed pocket.

Accordingly it is important to apparatus of this kind to insure against the blockage of seed carrier pockets in the cyclic carrier. By handling the seeds as gently as possible the generation of fractured seeds and other seed dust can be reduced. Further, as disclosed herein, a cyclic seed carrier has been provided whereby the pocket openings are subject to continual cleaning action.

In planting practices of the kind described wherein a line of uniformly spaced seeds are deposited, for example, in a furrow, it is desirable, in order to provide accurate spacing of seeds, to have the seed under the full control of the implement providing the planting. This is not always possible, especially where planting is being undertaken with windy conditions. Accordingly, while it is possible to know the whereabouts of each seed as it is carried through the planter, it is not always possible to closely control the final position of the deposited seed.

Various attempts have been made to solve the problem of windage in depositing the individual seeds. One attempt has employed a cyclic belt which serves to carry a column of seeds downwardly in a vertical direction at high speed followed by an abrupt change in direction of the belt whereby the seeds are propelled out of small pockets in the belt and into the ground. This arrangement has suffered from a number of disadvantages, one of which is that the free fall distance for each seed is considerable thereby allowing the wind to have its adverse effect.

Furthermore, planting cannot very well be synchronized with tractor speed without permitting the wind to have its adverse effect at low speed.

It is a general object of the present invention to provide an improved implement for planting a field-row with a line of individual seeds.

It is an object of the present invention to provide seeding apparatus whereby the problem of "skips" and "doubles" is significantly remedied to the point of virtually having been eliminated.

It is another object of the invention to provide a flexible belt carrier entailing seed pocket openings operable to impart a self-cleaning action.

It is a more particular object of the invention to provide a seeding apparatus whereby the problem of windage is minimized if not altogether eliminated.

It is another object of the invention to provide a seeding apparatus capable of travelling at various rates of speed with seed spacing remaining constant and seed placement accurate.

It is still another object of the invention to provide a seeding apparatus of extremely simple construction thereby minimizing the construction costs as well as subsequent maintenance.

Another object of the invention is to provide a seeding machine which virtually eliminates the planting of "doubles."

When planting a field-row of individual seeds, it is reassuring to be able to visually inspect each row of seeds as they are carried into their proper place on the ground. Accordingly, another object of the invention is the provision of seeding apparatus wherein visual inspection of a row of seeds being planted is readily permitted by a tractor operator.

These and other objects of the invention as well as features and advantages thereof will be more clearly apparent from the following description of a preferred embodiment when taken in conjunction with the drawings in which:

FIGURE 5 is a side elevation view, in section, taken along the line 5—5 of FIGURE 4 while retaining in phantom lines certain elements for positional orientation thereof;

FIGURE 7 is an enlarged detailed view, in section, taken along the line 7—7 of FIGURE 5;

FIGURE 8 is an enlarged detailed view, in section, taken along line 8—8 of FIGURE 5;

FIGURE 9 is an enlarged detailed view, in section, taken along the line 9—9 of FIGURE 5;

FIGURE 11 is a perspective view of another embodiment of the seed carrying belting arrangement;

FIGURE 12 is a detail isometric view of a portion of the seed carrier belt of FIGURE 11 at the delivery disposition thereof; and FIGURE 13 is an elevation section view of a portion of the belt of FIGURE 11 showing the articulating movement of the belt at the top and bottom of the seed delivery reach thereof. The line of sectioning in FIGURE 13 lies primarily along the line of pocket openings but steps over toward the chain links at a position downstream from the point of seed discharge from the belt.

Figures 1, 6, 10:
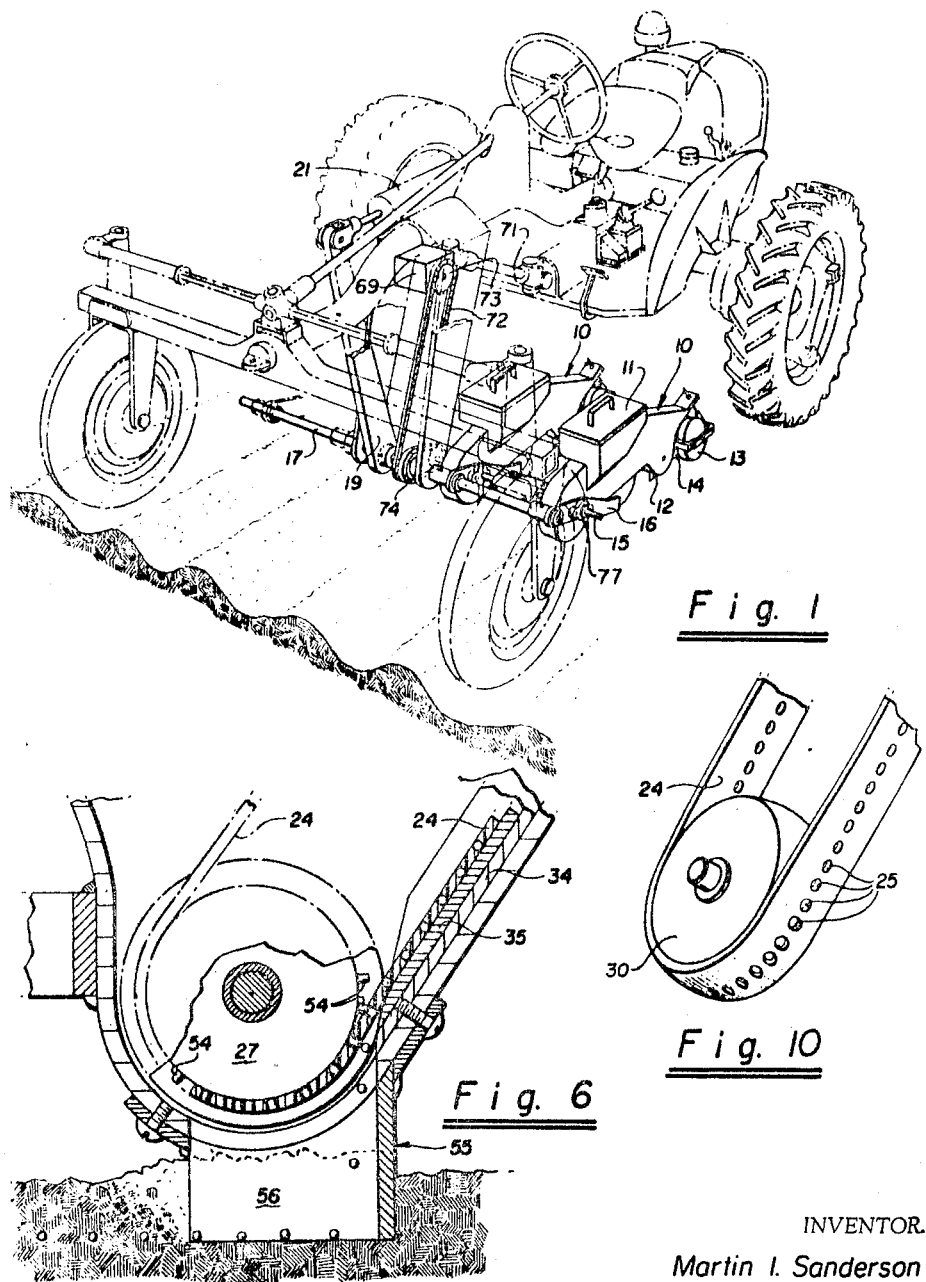
FIGURE 1 is a perspective view of seeding apparatus according to the present invention.
FIGURE 6 is an enlarged detailed view, in section, taken along the line 6—6 of FIGURE 5.
FIGURE 10 is a detail view of another embodiment of a seed release pulley according to the invention.

In general, there has been provided a farm implement unit for planting seeds at individual positions in a field-row. A number of these implements can be carried, for example, by a tractor as shown in FIGURE 1. Accordingly, where a plurality of seeding implements of the kind to be described are arranged in side-by-side relation, a number of rows of seeds will be planted for each pass of the tractor across a field.

The farm implement comprises generally a frame of a relatively thin, flat construction which is adapted to be drawn along a row to be planted. A flexible seed carrier belt is formed with spaced seed-receiving holes distributed along the length thereof, each extending through the belt. The belt is carried by the frame on pulleys so as to define a cyclic path lying substantially in an upstanding plane. The cyclic belt path includes a seed-carrying run and a return run. The seed-carrying run moves upwardly initially at a substantial inclined angle with respect to the horizontal to provide a seed-receiving reach. At the end of the seed-receiving reach, the seed-carrying run turns downwardly at a substantial angle forming a seed-delivery reach which extends as far as a delivery position adjacent ground level in order to deliver seed from the belt to the adjacent ground therebeneath. Seed retention means underlies seed in the holes of the belt during the seed-receiving and the seed-delivering reaches. A belt-charging seed hopper is disposed to overlie the seed-receiving reach whereby the seed-receiving reach of the belt can acquire seeds in the belt holes. The relatively high angle of the seed-receiving reach serves to agitate the overlying bulk seed in the hopper in an upwardly direction and thereby keep it active as it tumbles backwardly. In one embodiment a seed-retaining member lies beneath the belt and is terminated at a delivery disposition adjacent the ground to release seeds from their respective holes in the belt to cause them to fall freely to the ground. A bifurcated furrowing tool, provided with upstanding rearwardly diverging sides serves to shield the freely falling seed from the wind to permit each seed to fall accurately into a furrow formed by the furrowing tool.

The cyclic belt of the implement is preferably arranged whereby a portion of the return run of the belt is disposed to pass in light frictional facial engagement with the seed-receiving reach of the belt at the upper end thereof as the belt emerges from the seed hopper. Thus, excess seeds are removed from the belt and the possibility of planting seeds in excess of the seeds carried in each hole of the belt is eliminated.

As shown in FIGURE 1, a number of seeding implements 10 are drawn in side-by-side relation by a tractor across a field prepared for planting. Each implement 10 follows its assigned row.

Quite briefly stated, seeds stored in covered hopper 11 are carried for individual delivery into a furrow formed immediately to the rear of a furrowing tool 12.

A pair of packer wheels 13, 14, trail furrowing tool 12 and thereby serve to manipulate the soil in a manner to be described further below. Packer wheels 13, 14 support the trailing end of each implement 10 while the leading end of the implement is supported for free pivotal movement about an axis transversely thereof defined by a support shaft 15. In this manner, the packer wheels 13, 14 are permitted to freely follow the terrain contour.

Figure 2:
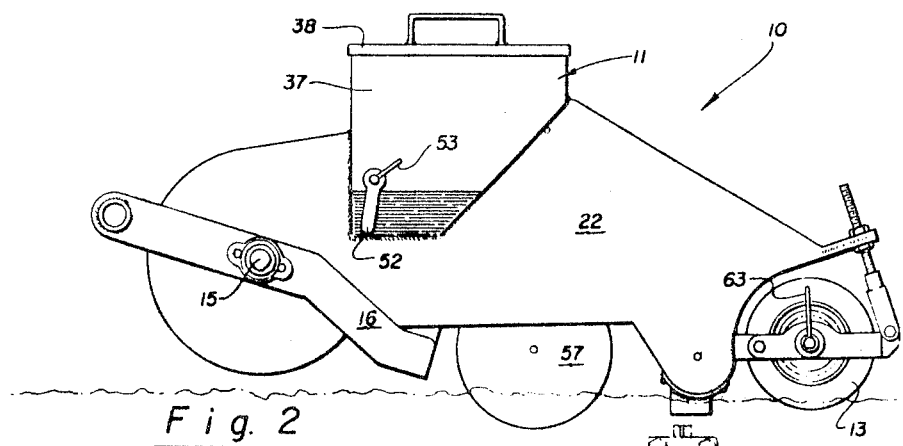
FIGURES 2 and 3 are side elevation views showing opposite sides of an implement for seeding a field-row.
Figure 4:
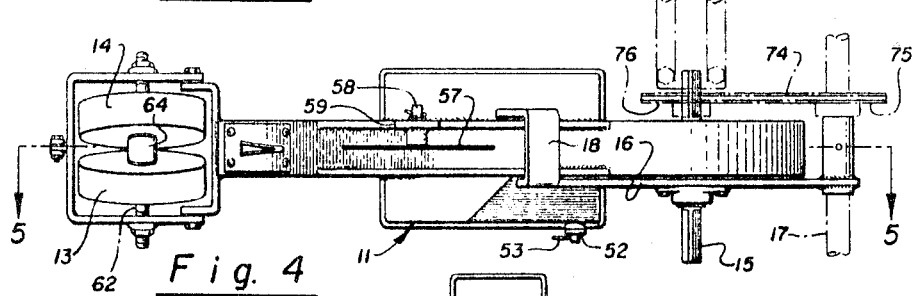
FIGURE 4 is a bottom view of FIGURE 3.
Figure 3:
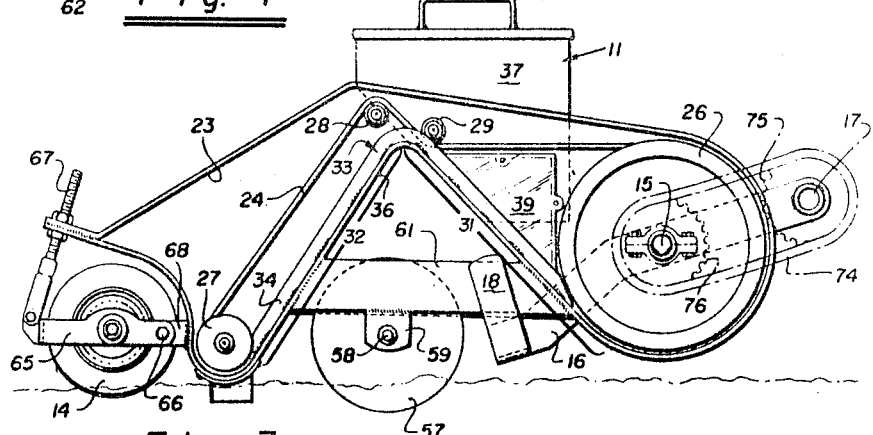

Means are also provided for arcuately rotating all implements 10 upwardly to raise their trailing portion clear of the ground to permit servicing the hoppers or while making turning movements at the end of each pass of the field. Accordingly, a support shaft 15 is carried by radial arms 16 extending from a rotatable tool bar 17. The free end of each arm 16 is formed with a U-shaped lifting portion 18 extending transversely beneath implement 10. Portions 18 are adapted to embrace the frame from beneath to carry it upwardly under counter-clockwise rotation of arm 16, as viewed in FIGURE 2. To rotate arm 16 for lifting movement, tool bar 17 is fixed to a lever arm 19 adapted to be rotated by a suitable actuator 21.

Each implement includes a frame of simple, inexpensive and rigid construction comprising a single side plate 22. Plate 22 is adapted to be disposed and carried in a substantially vertical plane. The periphery of plate 22 is bent or formed substantially normal to the plane of plate 22 to provide a flanged edge 23 substantially therearound to provide rigidity to plate 22.

A flexible seed carrier belt 24, of somewhat resilient material, is formed with spaced seed-receiving holes 25 distributed along its length. Belt 24 is carried by pulleys 26, 27 supported by plate 22 to define a cyclic path lying in an upstanding plane. Thus, belt 24 is trained about a drive pulley 26, a driven pulley 27 and a pair of idler pulleys 28, 29. The cyclic path defined by belt 24 includes generally a seed-carrying run from drive pulley 26 to driven pulley 27 and a return run from driven pulley 27 back to drive pulley 26. The seed-carrying run includes a seed-receiving stretch or reach designated generally 31 and a seed-delivering reach designated generally 32. Reach 31 is disposed at a substantial inclined angle to the horizontal, preferably on the order of twenty-five degrees or greater for purposes described further below.

Means defining reaches 31, 32 includes a guideway 33 for belt 24, guideway 33 being disposed generally in an A-shaped configuration. By making reference to FIGURES 5-8, the construction of guideway 33 can readily be seen. Guideway 33 comprises a channel member 34 of U-shaped transverse cross-section. The spacing between the legs of the U is dimensioned to loosely receive belt 24. The transverse cross-section of the bottom of guideway 33 is formed with convex curvature to provide a certain degree of self-guiding to the belt as well as to provide a spreading of the upper edges of each hole beyond their relaxed dimension. A convex bottom surface for guideway 33 can be applied along the length of channel member 34 in any suitable manner, as by attachment of a crowned bed member 35. Channel member 34 is attached, as by welding, to a flange 36 forming the A-shaped configuration of guideway 33. Flange 36 is secured, as by welding, to extend transversely of plate 22.

Thus, crowned bed member 35 provides a seed-retaining means carried by the frame and underlying the holes of the belt during the seed-receiving and seed-delivering reaches 31, 32.

A seed hopper for charging belt 24 is arranged to overlie the seed-receiving reach of belt 24 whereby the seed-receiving reach acquires seeds in each hole. That portion of guideway 33 underlying reach 31 serves as the bottom of a belt charging hopper 39 whereby belt 24 passes through the charging hopper 39 to receive seed.

The angle of belt 24 during the seed-receiving reach serves to agitate seed upwardly in the charging hopper and keep it active. Thus, a hopper assembly 11 includes a primary storage hopper 37 formed with a cover 38 and a secondary or belt charging hopper 39 for disposing seed into belt 24. Seed stored in hopper 37 flows into hopper 39 via a metering gate 41 (FIGURE 5). Gate 41 provides an adjustable passage between hoppers 37, 39 to control the level of seed in hopper 39 for optimum charging of belt 24.

Gate 41 is arranged to generally cover a passage 42 formed through plate 22. Gate 41 includes a vertically extending slot 43 and a horizontally extending slot 44. A stud 45 with an enlarged head extends through slot 43 to retain gate 41 and permit vertical adjusting movement. Gate 41 is further retained between a side guide 46 and a vertical side wall of the triangularly shaped hopper 39. Precise vertical positioning of gate 41 is provided by an eccentrically mounted pin 47 extending through slot 44. Pin 47 is fixed to and revolved by a rotatable spindle 48 carried in a bushing 49. Bushing 49 is fixed, as by welding, between plate 22 and a vertical wall 51 of hopper 39. A locking lever 52 is provided to retain the eccentric pin 47 in the position established by disposition of the handle 53, formed on the end of spindle 48.

Thus, in order to raise or lower gate 41, locking lever 52 is backed off sufficiently to permit rotation of handle 53. When handle 53 has been rotated to its desired position, it is held as locking lever 52 is taken up by rotation about the threads formed on the outer end of spindle 48. As locking lever 52 is rotated, it ultimately serves to tighten the threaded engagement of spindle 48 and thereby hold gate 41 in fixed relation to provide an appropriate metering of the flow of seed from storage hopper 37 into charging hopper 39.

Storage hopper 37 is formed to hold a substantial supply of seed in a generally rectangular shaped container carried above frame plate 22. Storage hopper 37, however, includes a volume which overhangs and lies alongside plate 22. Hopper 37 is tapered to converge downwardly to the region adjacent passage 42 thereby funnelling seed into passage 42.

The foregoing hopper construction therefore provides a storage hopper which supplies seed to a charging hopper. The gate 41 provides an adjustable passage between the charging and storage hoppers for metering the flow of seed from the storage hopper to the charging hopper to maintain the seed level in the latter at a selected level upon the seed-receiving reach of the belt. The passage formed by gate 41 is disposed so that in operation there will be delivered a stream of seed which falls freely through the air in a direction spilling into the midst of that portion of the seed which is being kept active by the upwardly inclined belt reach. By delivering seed to the charging hopper in this manner, congestion in the charging hopper is minimized.

At the lower end of delivery reach 32, the seed-retaining member, formed by crowned bed 35 and channel member 34, terminates at a delivery disposition adjacent the ground to release seeds to drop to the ground. The A configuration of belt 24 permits the belt to dip very close to the ground at one point to drop its seed but a short distance, e.g., on the order of 1 to 1½ inches. Accordingly, a single pulley 27 is used and formed with a plurality of teeth 54 coacting with holes 25 to positively release the seeds.

Release of seeds from belt 24 can also be accomplished by directing belt 24 over a crowned pulley 30 whereby the bottom edge of each hole is simultaneously expanded both laterally and longitudinally of the belt, as shown in FIGURE 10.

At the lower end of delivery reach 32, a furrowing tool 55 depends downwardly from frame 22 in fixed relation to the frame and is formed with a pair of rearwardly diverging upstanding sides 56 so as to plow a seed furrow. The bottom edge of tool 55 extends downwardly below the level of the periphery of packer wheels 13, 14 described further below. Sides 56 form a wind shield ensuring against seeds being blown while falling freely into the ground.

A knife blade, in the form of a colter blade 57, is compactly carried within the A configuration of belt 24 and is disposed immediately ahead of furrowing tool 55 so as to cut through clods in the path of tool 55. Thus, blade 57 is journalled on a stub shaft 58 carried by a downwardly extending support member 59. The upper portion of blade 57 is received between plate 22 and a longitudinal strengthening brace 61 disposed to form a cross piece for the A of flange 36.

A pair of packer wheels are arranged to trail behind the furrowing tool and selectively manipulate the soil as desired in several different manners. Packer wheels 13, 14 are arranged to rotate on an axle 62 formed to provide a V-shaped axis of rotation for the wheels. Each packer wheel is mounted for rotation about one leg of the V. Axle 62 is itself arranged to be selectively rotated, as by means of the lever arm 63, to move the vertex 64 of the V in an annular path. Thus, lever arm 63 can bring the vertex 64 to any selected disposition in its annular path to dispose the planes of wheels 13, 14 to meet in a line tangentially of and spaced radially from the path. Accordingly, the planes of wheels 13, 14 can meet below, behind, above or ahead of axle 62.

Where the planes of wheels 13, 14 are disposed to meet in a horizontal line below axle 62, wheels 13, 14 serve to pack soil upon the planted seeds. When the contrary condition for wheels 13, 14 exists, as where the planes of the packer wheels meet in a horizontal line disposed above axle 62, the packer wheels provide a desirable and satisfactory operation in muddy terrain. Where the mud of the field tends to adhere to the wheels, it will not be dislodged from above the seeds just planted. In short, wheels 13, 14 will straddle the seed strip so as to avoid problems found under muddy conditions.

By rotating axle 62 ninety degrees from either of the foregoing positions, the planes of wheels 13, 14 can be brought together in a vertical line either ahead or behind axle 62. When the planes of wheels 13, 14 meet in a line ahead of axle 62, they have the effect of spreading the banks of a furrow formed by furrowing tool 55. When the planes of wheels 13, 14 meet in a vertical line behind axle 62, their action serves to cover the furrow.

In addition to the four general dispositions of wheels 13, 14 mentioned, it will be readily apparent that the planes of wheels 13, 14 can be disposed to meet in a tangential line at any position on a circular path, the tangent being radially spaced therefrom. Various intermediate adjustments of the line of intersection of the planes of wheels 13, 14 will provide various intermediate degrees of performance of the wheels. For example, it has been found that by turning axle 62 a few degrees from the second described condition above, a skidding action occurs which serves to clean the wheels in muddy terrain. It is, therefore, intended that the above reference to horizontal and vertical lines of intersection is only generally descriptive of their performance and that such disposition of the wheels 13, 14 is not entirely critical.

The depth of furrow is controlled by wheels 13, 14. Wheels 13, 14 are supported in a pivotally mounted frame 65 carried by a pin 66 through a fixed bracket 68 formed to the flanged periphery 23 of plate 22. Frame 65 is held at its trailing end by an adjusting rod 67 which serves to position axle 62 a selected distance above the bottom edge of tool 55 thereby controlling the depth of operation of tool 55. Consequently, there has been provided a means carrying axle 62 which serves to vary the height thereof above ground level to vary the depth of the furrowing tool below ground level.

As noted above with respect to belt 24, pulley 26 operates as a drive pulley, and pulley 27 operates as a driven pulley. Means for operating pulley 26, as shown in FIGURE 1, includes a power take-off 69, driven by a rotating drive shaft 71 of the tractor shown. Power take-off 69 serves to drive a chain belt 72 trained about a pair of pulleys 73, the lower one of which is not shown in the drawings but is mounted for rotation around bar 17. A second chain belt 74 is trained about a pair of sprocket pulleys 75, 76. Belt 74 is driven by the lower one of pulleys 73 (hidden) to operate pulley 75 which rotates about tool bar 17. Pulley 76 is fixed to shaft 15. Shaft 15 is carried in journal bearing 77 provided on one side of the implement on the radial arms 16, and on the other side of the implement on shaft 15 adjacent pulleys 26. Drive pulley 26 is keyed, or otherwise fixed, to shaft 15 to rotate therewith under operation of chain belts 72, 74.

The cyclic movement of belt 24 is, therefore, synchronized to the rotation of drive shaft 71 which is itself synchonized with the velocity of the moving tractor. Accordingly, the tractor can operate at high or low speed without affecting the uniform spacing of seeds. Seed spacing is, therefore, controlled by the spacing of holes 25 along belt 24 for a given gear ratio between tractor drive and belt speed.

From the foregoing, it will be evident that there has been provided an improved seeding implement which permits relatively high speed planting wherein the accuracy of planting each seed is unaffected by windage and wherein the planting of "doubles," i.e., an excess number of seeds in each seed location, is precluded.

Furthermore, the manner of training the cyclic carrier belt serves to permit seeds to be released for planting at a delivery disposition quite close to the adjacent ground.

From the foregoing, it will also be apparent that the seed-delivering reach is laid in an open-topped guideway to permit visual operator inspection, from above, of the seed-filled holes moving to the delivery disposition. The open rear of the furrowing tool further aids in visual inspection of seed delivery into a furrow. To further facilitate visual inspection from the operator's station as for example, when riding in the seat of the tractor shown in FIGURE 1, the implements 10 that are placed to the left of the operator are arranged as described above, whereas implements disposed to the right of the operator are formed with side plate 22 on the opposite side of the peripheral flange. Hopper assembly 11 and other associated apparatus are also formed in reverse hand of that described and shown in the drawings. In short, there is provided a left-hand and a right-hand style of implement so that the operator can view all seed-delivering belts during at least the delivery stretch of their travel as well as providing inspection of each trail of seeds passing to the rear of the bifurcated furrowing tool 55.

As mentioned above the problem of planting "doubles" requires that the crop be thinned by hand labor. A comparable problem is encountered whenever the spacing between a pair of plants is too close to permit either one of the plants to fully mature and accordingly one of the plants must be removed. Therefore it is a matter of continuing interest that successive seeds placed in a field row be planted with consistently uniform spacing between adjacent plants. A further advantage to be attained with apparatus capable of providing a consistently uniform spacing between adjacent plants is to be found in its contribution toward simplifying the job of designing mechanical harvesting apparatus for stoop-labor crops.

One of the significant causes of planting seeds with inadequate spacing between successive seeds has been observed to be the fact that in order to provide practicable equipment a relatively high rate of vehicle travel is required and upon discharging the seeds from the planter they have a tendency to roll along the furrow. It should be recalled that seeds of the kind described are frequently formed of a size resembling a B-B shot. With my construction, seeds are caused to be discharged from the seed carrier belt with very little forward momentum. The seed delivery reach is traveling downwardly and rearwardly at a predetermined speed proportional to the forward velocity of the tractor. The rearward movement of the seed delivery reach serves at least to partially, if not fully, nullify that forward momentum imparted to the seed attributable to movement of the apparatus. Thus, resultant forward momentum relative to the ground, which is applied to seed being discharged, is quite limited.

As shown in FIGURES 11, 12 and 13 another embodiment of the apparatus is provided which features a flexible belt comprised generally of a series of adjacent leaf elements extending transversely of the cyclic path and arranged in side-by-side relation so as to form a closed loop of leaf elements. The leaf elements are arranged to articulate with respect to one another whereby one leaf element of each adjacent pair can articulate across the plane of the other. The adjacent sides of each pair of leaf elements are formed so as to provide a pocket opening between pairs of elements for carrying seeds.

More particularly as shown in FIGURE 11 a cyclic belt 80 is trained to travel about a path substantially as previously described. Means are provided for supporting belt 80 to travel such path and for positively driving the belt. Thus a sprocket pulley 81 is mounted upon shaft 15 whereby the teeth 82 can engage the links 83 of a chain drive portion of belt 80. As mentioned above shaft 15 is positively driven by a chain drive transmission from the tractor. A sprocket pulley 84 carries a portion of the belt 80 closely adjacent to the ground to provide a delivery disposition of the belt path. Additional pulleys 85, 86, 87 are provided substantially as previously described.

Belt 80 is formed from a series of leaf elements 91. Each leaf element 91 includes a seed carrier portion 91a and a chain drive portion 91b. Portion 91b is relatively broad and flat to provide an upper surface 92 adapted to support the links 83 of a chain belt. Adjacent links 83 of the chain belt are joined together for articulation by means of pivot pins 93.

The seed carrier portion 91a of each leaf element 91 includes a broad planar leaf having an upper face 94, a lower face 95, and sides 96. The opposite sides 96 of each leaf element 91 are tapered to lie in converging planes 97. The upper edge 98 of each side 96 lies substantially on the axis 99 of a corresponding one of the pivot pins 93 of the chain belt. Thus it will be noted that each of the leaf elements can articulate across the plane of an adjacent one of the leaf elements and thereby travel a path including reversed curves. Accordingly the delivery disposition of the belt path provided by the simple utilization of a single pulley such as sprocket pulley 84 can be employed as was previously mentioned respecting pulley 27.

It will be noted however that the leaf elements are continuously closely adjacent and preferably are continuously contiguous so as to accurately preserve the dimensions of a series of pocket openings 101 which are formed as described further below. By disposing leaf elements 91 in continuous closely adjacent and preferably contiguous relation the diameter of each pocket opening 101 can be maintained within tight limits thereby avoiding the need to provide any underlying retaining member as was previously described with respect to member 33. Thus, it should be appreciated that seeds for various present crops have a consistently uniform predetermined diameter. As to be described further below, the seeds are retained in pocket openings 101 by means of a plurality of confronting side wall portions of each opening. The portions extend radially inwardly of each pocket opening and thereby underlie the seeds carried therein. Slight variations in forming the pocket opening can cause seeds to pass through the pocket before reaching the planting position. However, if the pocket openings can be held to close tolerances certain seeds are of such consistently uniform diameter as to permit their use without need for an underlying member.

Further, if the pocket openings are too large they may capture more than a single seed and plant a "double." Close manufacturing tolerances are therefore desired.

Leaf elements 91 are tandemly coupled together by means of the pivot pins 93 of the chain links 83. It will be appreciated that the closely adjacent leaf elements as mounted in this manner accommodate a modest "working" up and down between adjacent sides 96 thereby aiding in eliminating seed dust from the belt and keeping it clean.

In apparatus of the kind described it should be understood that fractured seeds and other seed particles can generate sufficient dust and residue to form a congestion in the seed hopper. Such congestion has often been the source of clogging of seed carrier holes or other openings, particularly of the type wherein the pocket opening does not extend completely through the seed carrier belt. As mentioned at the outset above, it is to be understood that whenever the pocket opening becomes incapable of carrying its assigned seed it will provide one "skip" for each revolution of the carrier.

Each pocket opening 101 of belt 80 includes a pair of confronting side wall portions 102. One of the side wall portions is formed in each of the two confronting sides 96 and disposed to cooperate in forming a pocket opening 101. By disposing edges 98 substantially on the axes 99 of pivot pins 93, the confronting side wall portions 102 move apart about axes 99 so as to enlarge openings 101 at the bottom end of the pocket and pass a seed 103 from the pocket. It will be seen that as belt 80 travels about sprocket pulley 84 one of the side wall portions 102 will be moved with respect to the other at the delivery disposition of belt 80 sufficiently for each adjacent pair of leaf elements arriving at the delivery disposition to drop its seed to the ground.

For a given pocket opening 101 it will be observed that as the belt 80 is continuously driven and after the pocket opening 101 leaves the region of pulley 84 it will again be opened as it passes about pulley 85. As the given pocket opening 101 passes under pulley 87 it will close somewhat in passing around the reversed curve of pulley 87 and then proceed to pass about pulley 81 where it is again opened. During the unsupported stretches of belt 80 a modest "working" between adjacent leaf elements 91 will further serve to remove seed dust and other particulate matter from the belt so as to maintain its clean condition. Further, where reliance is not be be placed on an underlying member, such as member 33, seed abrasion is further reduced since the seeds need not slide along the underlying member.

During the seed receiving reach of belt 80, the pocket openings will receive and retain a seed in each. The side wall portions 102 of each pocket opening 101 converge in an inverted truncated conical configuration wherein the open passage at the bottom of the pocket has a diameter less than the diameter of seeds being carried. Accordingly, a plurality of confronting side wall portions are included in each seed hole wherein the portions extend radially inwardly to underlie seed in the holes. The confronting side wall portions are pivoted to move between near and far positions respectively contracting and enlarging the passage for seed whereby when the passage is sufficiently enlarged by travel about pulley 84 the seed will be discharged.

From the foregoing it will be evident that belt 80 provides an extremely gentle handling of each seed carried therein. The gentle handling and manner of opening the pockets 101 serves to substantially eliminate the existence of "skips" and "doubles." For example in one test run employing apparatus utilizing the above belt construction 2,312 seeds were planted with two "skips" and no doubles. Accordingly it is believed evident that a substantially improved seed carrier construction and farm implement is provided.

I claim:

1. A farming implement for planting seeds individually in a field-row comprising a frame adapted to move along said row, a flexible seed carrier belt formed with spaced seed-receiving holes distributed along the length thereof, the holes extending from one face of the belt to the other, means on the frame supporting said belt in a cyclic path lying in an upstanding plane, said path including a seed-carrying run and a return run, the seed carrying run being disposed to maintain the axis of each hole in a generally upwardly direction to retain seed therein, said seed carrying run including a seed-receiving reach, said seed-carrying run further including a seed-delivery reach terminating at a delivery disposition closely adjacent ground level, means for guiding said belt to carry those ends of the holes which constitute the bottom ends thereof during said seed-carrying run to pass nearest to the ground at said delivery disposition to deliver seed from the bottom of each hole to the ground beneath, seed retaining means underlying the seeds in said belt during said seed-receiving and seed-delivering reaches to retain seeds in said holes of the belt, a charging hopper adapted to contain seed overlying said receiving reach, said receiving reach passing in cooperative relation to said hopper to acquire seed in the holes of said belt, said seed retaining means serving to open each hole sufficiently at said delivery disposition to release the seed to fall from the belt.

2. Farm implement apparatus according to claim 1 wherein said retaining means comprises an elongated member underlying said holes in belt supporting relation.

3. Farm implement apparatus according to claim 1 wherein said seed retaining means comprises confronting portions of the side wall of each hole, said portions extending radially inwardly of each hole to constrict the passage therethrough, and means supporting said confronting portions for movement between near and far positions respectively contracting and enlarging the passage therebetween.

4. A farming implement for planting seeds individually in a field-row comprising a frame adapted to move along said row, a flexible seed carrier belt formed with spaced seed-receiving holes distributed along the length thereof, said belt being carried by the frame on pulleys to define a cyclic path lying in an upstanding plane, said path including a seed carrying run and a return run, the seed-carrying run being disposed to move upwardly at a substantial inclined angle to the horizontal to define a seed-receiving reach, said seed-carrying run turning downwardly at a substantial angle at the upper end of said seed-receiving reach and extending therefrom to a delivery disposition closely adjacent ground level to deliver seed therefrom to the ground beneath, a seed-retaining member carried by the frame and underlying the holes of said belt during said seed-receiving and seed-delivering reaches, a charging hopper adapted to contain seed overlying said receiving reach, said receiving reach passing through said hopper to acquire seeds in the holes of said belt, the angle of said receiving reach serving to agitate the seed upwardly in said hopper and keep it active, and means directing a stretch of the return run of said belt into frictional facial engagement with the receiving reach of said belt at the upper end of said receiving reach to remove excess seeds therefrom.

5. In a farming implement for planting seeds individually in a field-row, apparatus comprising a frame adapted to move along said row, a flexible seed carrier belt formed with spaced seed-receiving openings distributed along the length thereof, means supporting said belt on the frame in a cyclic path lying in an upstanding plane, said path including a seed carrying run and a return run, the seed-carrying run including a seed-receiving reach, said seed-carrying run further extending to include a seed-delivery reach terminating at a delivery disposition closely adjacent ground level to deliver seed therefrom to the ground beneath, seed-retaining means adapted to underlie seeds in the holes of said belt during said seed-receiving and seed-delivering reaches, a charging hopper adapted to contain seed overlying said receiving reach, said receiving reach passing in cooperative relation to said hopper to acquire seeds in the holes of said belt, and means directing a stretch of the return run of said belt into frictional facial engagement with the carrying run of said belt to remove excess seeds therefrom.

6. A farming implement for planting seeds individually in a field-row comprising a frame adapted to move along said row, a flexible seed carrier belt formed with spaced seed-receiving holes distributed along the length thereof, the holes extending from one face of the belt to the other, means on the frame supporting said belt in a cyclic path lying in an upstanding plane, said path including a seed-carrying run and a return run, the seed carrying run being disposed to maintain the axis of each hole in a generally upwardly direction to retain seed therein, said seed carrying run being further disposed to move upwardly at a substantial inclined angle to the horizontal to define a seed-receiving reach, said seed-carrying run further including a seed-delivery reach moving downwardly at a substantial angle to a delivery disposition closely adjacent ground level, means for guiding said belt to carry those ends of the holes which constitute the bottom ends thereof during said seed-carrying run to pass nearest to the ground at said delivery disposition to deliver seed from the bottom of each hole to the ground beneath, seed retaining means adapted to underlie seeds in said belt during said seed-receiving and seed-delivering reaches, a charging hopper adapted to contain seed overlying said receiving reach, said receiving reach passing in cooperative relation to said hopper to acquire seed in the holes of said belt, the angle of said receiving reach serving to agitate the seed upwardly in said hopper and keep it active, said seed retaining means being formed whereby at said delivery disposition each hole opens so as to release the seeds to fall from the belt, a bifurcated furrowing tool carried by said frame, and a knife blade carried by said frame immediately ahead of said furrowing tool serving to cut through clods in the path of said tool, said blade being disposed beneath and between portions of said seed-receiving and seed-delivering reaches of said belt.

7. A farming implement for planting seeds individually in a field-row comprising a frame adapted to move along said row, a flexible seed carrier belt formed with spaced seed-receiving holes distributed along the length thereof, means on the frame supporting the belt in a cyclic path lying in an upstanding plane, said path including a seed-carrying run and a return run, said seed carrying run being disposed to move upwardly at a substantial inclined angle to the horizontal to define a seed-receiving reach, said seed-carrying run further including a seed-delivery reach moving downwardly at a substantial angle to a delivery disposition closely adjacent ground level, means for guiding said belt to carry the holes to said delivery disposition to deliver seed from each hole to the ground beneath, seed retaining means underlying the seeds in said belt during said seed-receiving and seed-delivering reaches, a charging hopper adapted to contain seed overlying said receiving reach, said receiving reach passing in cooperative relation to said hopper to acquire seed in the holes of said belt, the angle of said reeciving reach serving to agitate the seed upwardly in said hopper and keep it active, said seed retaining means being formed whereby at said delivery disposition each hole opens so as to release the seeds to fall from the belt, a storage hopper supplying seed to the charging hopper, and means forming an adjustable passage between said charging and storage hoppers for metering the flow of seed from the storage hopper to the charging hopper to maintain the seed level in the latter at a selected level upon the seed receiving reach, said passage being disposed and adapted to lie above said selected level for that portion of the store of seed overlying said seed receiving reach which is being kept active by said belt and to deliver a stream of seed to fall freely through the air and spill into the midst of said portion of active seed whereby congestion in said charging hopper is minimized.

8. A farming implement for planting seeds individually in a field-row comprising a vehicle including an operator's station thereon, an implement frame supported by said vehicle and adapted to move along said row, a flexible seed carrier belt formed with spaced seed-receiving holes distributed along the length thereof, the holes extending from one face of the belt to the other, means supporting said belt in a cyclic path lying in an upstanding plane, a seed hopper supported by the frame along the path to charge the holes of the belt with seeds to be carried therein, said path including a seed-carrying run and a return run, the seed carrying run being disposed to maintain the axis of each hole in a generally upwardly direction to retain seed therein, said seed-carrying run being further disposed to move upwardly at a substantial inclined angle to the horizontal to define a seed-receiving reach, said seed-carrying run including a seed-delivery reach moving downwardly at a substantial angle to a delivery disposition closely adjacent ground level, means serving to guide said belt to carry those ends of the holes which constitute the bottom ends thereof during said seed-carrying run to pass nearest to the ground at said delivery disposition to deliver seed from the bottom of each hole to the ground beneath, said delivery disposition being first preceded by said seed delivering reach and then by said seed-receiving reach, said seed delivering reach extending rearwardly with the upper face of the belt exposed substantially unobstructedly to viewing from said operator's station, the rear of said implement being disposed ahead of said operator's station in position to permit continuous visual operator inspection of the seed filled holes of said delivery reach moving to said delivery disposition, a bifurcated furrowing tool carried by the frame ahead of the operator's station and open at the rear, said furrowing tool being disposed immediately ahead of said delivery disposition whereby visual inspection of a trail of seed delivered to the ground may be continuously monitored from said operator's station without undue diversion from the handling of said vehicle.

9. Farm implement apparatus according to claim 1 wherein said seed retaining means is carried by the frame and extends through both the seed receiving and seed delivery reaches of said belt, said retaining means being formed as an A-shaped guideway to channel the belt upwardly through the charging hopper and then downwardly to the delivery disposition, said guideway being formed with a U-shaped transverse channel therein dimensioned to loosely receive the belt, the bottom of said guideway being formed with a convex transverse cross-section serving to spread open the tops of the holes in the belt lying therein.

10. Farm implement apparatus according to claim 1 wherein said guide means includes a crowned pulley disposed at said delivery disposition, said belt being trained around said pulley to cause the edge of each hole at the bottom end thereof to be expanded both laterally and longitudinally of the belt to release the seed therefrom.

11. In a farm implement for seeding, a frame supported to travel over the ground, a hopper supported by the frame adapted to contain a supply of seeds to be planted, endless belt means carried by the frame for continuous movement in a cyclic path to transfer seeds individually from the seed hopper to a seed delivery station for planting, said belt comprising a series of adjacent leaf elements extending transversely of the path and arranged in side by side relation to form a closed loop thereof, the adjacent sides of each pair of elements being formed to provide a pocket opening therebetween extending through the belt and adapted to carry a seed, said pocket openings being unobstructed at the opposite ends thereof and thereby adapted to receive seed via one end and discharge the seed from the other end, sprocket means carried on the frame supporting said belt means for travel along said path and chain drive means coupling each adjacent pair of said leaf elements to permit one to articulate with respect to the other, said chain drive means cooperating with said sprocket means to provide positive displacement of said belt means by said sprocket means, each pocket opening being formed to enlarge when said one element articulates in one direction and to contract when said one element articulates in its other direction.

12. A flexible belt for continuous movement in a cyclic path to transfer seeds individually from a seed hopper to a seed delivery station for planting, said belt comprising a series of adjacent leaf elements extending transversely of the path and arranged in side by side relation to form a closed loop thereof, the adjacent sides of each pair of elements being formed to provide a pocket opening therebetween extending through the belt, the walls of each said pocket opening converging to be adapted to engage and support a seed therein, said openings being otherwise unobstructed at the opposite ends thereof for accepting seed at one end and discharging it from the other, means coupling each adjacent pair of said leaf elements to permit one to articulate with respect to the other, the last named means serving to form a drive chain secured to each of said leaf elements, each pocket opening being formed to enlarge when said one element articulates in one direction and to contract when said one element articulates in its other direction.

13. A flexible belt for continuous movement in a path to transfer seeds individually from a seed hopper to a seed delivery station for planting, said belt comprising a series of continuously substantially contiguous planar leaf elements extending transversely of the path and arranged in side by side relation to form a closed loop thereof, the adjacent sides of each pair of elements being formed to provide a pocket opening therebetween extending through the belt and adapted to carry a seed, means coupling each adjacent pair of leaf elements for articulated movement therebetween permitting one to articulate across the plane of the other, each pocket opening being formed to enlarge when said one element articulates across the plane of said other in one direction and to contract when said one element articulates in an opposite direction.

14. A flexible belt according to claim 13 wherein each pocket opening includes a first side wall portion carried by one of each adjacent pair of leaf elements and a second side wall portion carried by the other of each adjacent pair of leaf elements to cooperate in forming said pocket opening, the axes of articulation for each adjacent pair of leaf elements lying substantially along the upper edges of each of said pairs of adjacent sides, said sides therebelow being formed to diverge away from each other.

15. In a farm implement for seeding having a frame supported to travel over the ground and a hopper supported by the frame adapted to contain a supply of seeds to be planted, endless belt means carried by the frame, and means supporting the endless belt means for cyclic travel in an upstanding plane, the path of the belt means including a seed carrying run and a return run, the seed carrying run including an extent passing adjacent the hopper to provide a seed receiving reach of belt travel, the seed receiving reach being disposed for acquisition of seeds by the belt from the hopper, said seed carrying run further extending to include a delivery reach of belt travel terminating at a delivery disposition closely adjacent ground level to deliver seed therefrom to the ground, said belt means comprising a series of leaf elements tandemly coupled to each other in a closed loop to form said belt thereof and including a series of seed receiving openings formed through the belt and distributed along the belt to provide seed carrying pockets, the pockets being disposed to be open at the top to receive a seed and open at the bottom to discharge the seed at said delivery disposition.

16. Farm implement apparatus according to claim 15 wherein each pocket opening includes a first side wall portion carried by one of each adjacent pair of leaf elements and a second side wall portion carried by the other of each adjacent pair of leaf elements to cooperate in forming said pocket opening means supporting said leaf elements for articulating movement therebetween to permit said first and second wall portions to move apart about an axis disposed transversely of the belt said axis being disposed for enlarging the opening at the bottom end of the pocket to pass a seed retained therein from the pocket, and means serving to move one of said side wall portions with respect to the other at said delivery disposition sufficiently for each adjacent pair of leaf elements arriving thereat to deliver a seed therefrom to the ground.

References Cited by the Examiner
UNITED STATES PATENTS

| | | | |
|---|---|---|---|
| 12,152 | 1/1855 | Anderson | 222—371 X |
| 807,541 | 12/1905 | Cunningham et al. | 198—179 |
| 3,022,755 | 2/1962 | Roepke | 111—77 |
| 3,122,283 | 2/1964 | Walters | 222—371 |
| 3,148,644 | 9/1964 | Keeton | 11—79 |

ABRAHAM G. STONE, *Primary Examiner.*

WILLIAM A. SMITH III, *Examiner.*